US009334806B2

(12) United States Patent
Carter et al.

(10) Patent No.: US 9,334,806 B2
(45) Date of Patent: May 10, 2016

(54) METHODS FOR MANUFACTURING AN ADDITIVELY MANUFACTURED FUEL CONTACTING COMPONENT TO FACILITATE REDUCING COKE FORMATION (71) Applicant: General Electric Company, Schenectady, NY (US)

(72) Inventors: William Thomas Carter, Galway, NY (US); James Anthony Ruud, Jr., Delmar, NY (US); Lawrence Bernard Kool, Clifton Park, NY (US); Justin John Gambone, Jr., Watervliet, NY (US); Christine Mary Furstoss, Saratoga Springs, NY (US)

(73) Assignee: General Electric Company, Niskayuna, NY (US)

( * ) Notice: Subject to any disclaimer, the term of this patent is extended or adjusted under 35 U.S.C. 154(b) by 180 days.

(21) Appl. No.: 14/018,537

(22) Filed: Sep. 5, 2013

(65) Prior Publication Data
US 2015/0060403 A1    Mar. 5, 2015

(51) Int. Cl.
*C03C 15/00* (2006.01)
*F02C 7/30* (2006.01)
(Continued)

(52) U.S. Cl.
CPC ... *F02C 7/30* (2013.01); *B22F 3/22* (2013.01); *C22C 1/0491* (2013.01); *C23C 10/02* (2013.01);
(Continued)

(58) Field of Classification Search
CPC . F02C 7/30; F05D 2230/31; F05D 2230/314; F05D 2230/313; F05D 2230/40; F05D 2230/42; C23C 10/02; C23C 10/30; C23C 10/60; B22F 2003/24; B22F 2003/242; B22F 3/1055

USPC ........ 216/53, 94, 102, 104, 65, 105; 427/237, 427/331
See application file for complete search history.

(56) References Cited

U.S. PATENT DOCUMENTS

| 6,758,914 B2 | 7/2004 | Kool et al. |
| 7,575,694 B2 | 8/2009 | Kool et al. |

(Continued)

FOREIGN PATENT DOCUMENTS

| EP | 1162286 A1 | 12/2001 |
| EP | 2570595 A1 | 3/2013 |
| WO | 2010134917 A1 | 11/2010 |

OTHER PUBLICATIONS

International Search Report and Written Opinion issued in connection with corresponding WO Application No. PCT/US2014/053373 dated Dec. 9, 2014.

*Primary Examiner* — Lan Vinh
(74) *Attorney, Agent, or Firm* — John P. Darling (57) ABSTRACT

A method for manufacturing a fuel contacting component that facilitates reducing coke formation on at least one surface of the fuel contacting component is disclosed herein. The method includes applying a slurry composition including a powder including aluminum to the component surface, wherein the fuel contacting component is formed by an additive manufacturing process. The slurry composition is heat treated to diffuse the aluminum into the component surface. The heat treatment comprises forming a diffusion aluminide coating on the component surface, wherein the diffusion coating comprises a diffusion sublayer formed on the component surface and an additive sublayer formed on the diffusion sublayer. The method further comprises removing the additive sublayer of the diffusion aluminide coating with at least one aqueous solution such that the diffusion sublayer and the component surface are substantially unaffected, wherein the diffusion layer facilitates preventing coke formation on component surface.

19 Claims, 5 Drawing Sheets (51) Int. Cl.
  *C23C 10/02* (2006.01)
  *C23C 10/30* (2006.01)
  *C23C 10/60* (2006.01)
  *B22F 3/22* (2006.01)
  *C22C 1/04* (2006.01)
  *B22F 3/105* (2006.01)
  *B22F 3/24* (2006.01)

(52) U.S. Cl.
  CPC ............... *C23C 10/30* (2013.01); *C23C 10/60* (2013.01); *B22F 3/1055* (2013.01); *B22F 2003/242* (2013.01); *B22F 2003/247* (2013.01); *F05D 2230/31* (2013.01); *Y02P 10/295* (2015.11)

(56) References Cited

U.S. PATENT DOCUMENTS

| | | | |
|---|---|---|---|
| 7,829,142 | B2 | 11/2010 | Kool et al. |
| 7,935,642 | B2 | 5/2011 | Kool et al. |
| 2003/0083213 | A1 | 5/2003 | Kool et al. |
| 2007/0298269 | A1 | 12/2007 | Kool |
| 2008/0202552 | A1* | 8/2008 | Kool et al. ............ 134/2 |
| 2009/0261068 | A1 | 10/2009 | Kool et al. |
| 2010/0062180 | A1* | 3/2010 | Tuppen et al. ......... 427/555 |
| 2010/0136240 | A1 | 6/2010 | O'Connell et al. |
| 2010/0151125 | A1* | 6/2010 | Kool et al. ............ 427/226 |
| 2011/0311389 | A1 | 12/2011 | Ryan et al. |
| 2012/0222306 | A1 | 9/2012 | Mittendorf et al. |
| 2013/0071562 | A1* | 3/2013 | Szuromi et al. ....... 427/237 |
| 2013/0316084 | A1* | 11/2013 | Szuromi et al. ....... 427/383.1 |

* cited by examiner

METHODS FOR MANUFACTURING AN ADDITIVELY MANUFACTURED FUEL CONTACTING COMPONENT TO FACILITATE REDUCING COKE FORMATION

BACKGROUND

The field of disclosure relates to coatings that inhibit the formation and adhesion of deposits on surfaces of hydrocarbon fuel contacting components. More specifically, to methods for manufacturing an additively manufactured hydrocarbon fuel contacting component that reduces the deposition of carbonaceous deposits on the surfaces of fuel contacting components, such as, but not limited to fuel nozzles, swirlers, and other fuel system components of gas turbine engines that are manufactured by additive manufacturing.

Additive manufacturing is a known technology that enables the "3D-printing" of components of various materials including metals and plastics. In additive manufacturing, a part is built in a layer-by-layer manner by leveling metal powder and selectively fusing the powder using a high-power laser. After each layer, more powder is added and the laser forms the next layer, simultaneously fusing it to the prior layers to fabricate a complete component buried in a powder bed. When removed from the powder bed, the component typically has a rough surface finish that must be improved via post-build processes such as grit blasting, grinding, sanding, or polishing to meet industry standards. Furthermore, the surfaces internal passages for liquid hydrocarbon fuel contacting components require additional processing to protect the component surface from the harsh operating environment of gas turbine engines.

In order to increase the efficiency of gas turbine engines, higher operating temperatures are sought. For this reason, the high temperature durability of the engine components must correspondingly increase. With the formulation of superalloys, such as nickel-based and cobalt-based, significant advances in high-temperature capabilities are being achieved. Consequently, in the absence of a protective coating, sensitive superalloy components, e.g., the turbine and combustor, typically will not endure long service exposures without accelerated wear. One such coating is referred to as a coke barrier coating to prevent the formation of undesired carbonaceous deposits on fuel contacting components that occur when hydrocarbon fluids, such as fuels and lubricating oils, are at elevated temperatures.

In the case of fuels, it is generally accepted that there are two distinct mechanisms occurring within two overlapping temperature ranges. In the first mechanism, referred to as the coking process, a generally consistent increase in the rate of formation of carbonaceous coke deposits occurs above temperatures of about 650 degrees Fahrenheit (° F.) (345 degrees Celsius (° C.)). Coke formation is the result of high levels of hydrocarbon pyrolysis, and eventually limits the usefulness of the fuel contacting component. A second mechanism primarily occurs at lower temperatures, generally in the range of about 220° F. to about 650° F. (about 105° C. to about 345° C.), and involves oxidation reactions that lead to polymerization and carbonaceous gum deposits. Both coke and gum formation and deposits can occur simultaneously at temperatures where the above ranges overlap. Moreover, the rough surface finish of additively manufactured components generally includes a number of troughs or pits that allow fuel to pool therein, leading to coke and gum formation that subsequently prevent efficient flow of the fuel through the engine.

Higher engine operation temperatures and the rough interior surface finishes increase the likelihood that carbonaceous deposits can severely choke the flow of fuel and air through fuel nozzles and swirlers, affecting operating conditions (e.g., mixing of fuel and air, proper flow of fuel and oxygen into the combustor) and may reduce fuel efficiency and increase emissions. As a result it is important to reduce the rough interior finish and protect the fuel contacting surfaces of these components with a coating that prevents the formation and adhesion of both coke and gum deposits.

BRIEF DESCRIPTION

In one aspect, a method of manufacturing a fuel contacting component is provided. The method facilitates reducing coke formation on at least one surface of the fuel contacting component that is exposed to a liquid fuel. The method includes applying a slurry composition that includes a powder including aluminum to the at least one surface. The fuel contacting component is formed by an additive manufacturing process. The slurry is heat treated to diffuse the aluminum into the at least one surface. The heat treatment includes forming a diffusion aluminide coating on the at least one surface. The diffusion sublayer includes a diffusion sublayer formed on the at least one surface and an additive sublayer formed on the diffusion sublayer. The method further includes removing the additive sublayer of the diffusion aluminide coating with at least one aqueous solution such that the diffusion sublayer and the at least one surface are substantially unaffected. The diffusion layer facilitates preventing coke formation on the at least one surface.

In another aspect, a method of manufacturing a component is provided. The method includes forming a diffusion aluminide coating on a surface of a fuel contacting component formed by additive manufacturing and partially removing the diffusion aluminide coating from the surface such that a remaining portion of the diffusion aluminide coating facilitates preventing coke formation on the fuel contacting component surface.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION OF THE INVENTION

In the following specification and the claims, reference will be made to a number of terms, which shall be defined to have the following meanings.

The singular forms "a", "an", and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The additive manufacturing and diffusion aluminide coating methods described herein provide cost-effective methods for reducing the amount of coke formation and improving the surface finish on an interior surface of a fuel contacting component fabricated by additive manufacturing, such as a fuel nozzle in a gas turbine engine. The embodiments described herein facilitate the formation of a coke barrier coating on a component to protect the component and extend its useful lifetime. Specifically, the methods described herein include applying a slurry composition to at least one surface of an additively manufactured component. The slurry is diffused into the surface of the component to create a diffusion aluminide coating comprising a diffusion sublayer on the component surface and an additive sublayer on the diffusion sublayer. Moreover, the methods described herein further facilitate removal of the additive sublayer using an aqueous solution to reduce the component surface roughness and to produce the coke barrier coating on the component surface. The diffusion process reduces the roughness of the component surface by filling in the troughs and removing the peaks formed during the additive manufacturing process. The remaining diffusion sublayer of the diffusion aluminide coating acts as a coke barrier coating to prevent coke deposits from forming a film on the component surface. The devices, systems, and methods are described herein as applied generally to any fuel contacting component fabricated by additive manufacturing. More specifically, the devices, systems, and methods described herein may be applied to, without limitation, fuel nozzles used in aircraft engines, fuel injectors used in gas turbine engines, and any component located within a hot gas path such as turbine blades, turbine nozzles, and bearings. Generally, the devices, systems, and methods described herein may be applied to any component where surface finish of an internal passage is critical.

Figure 1:
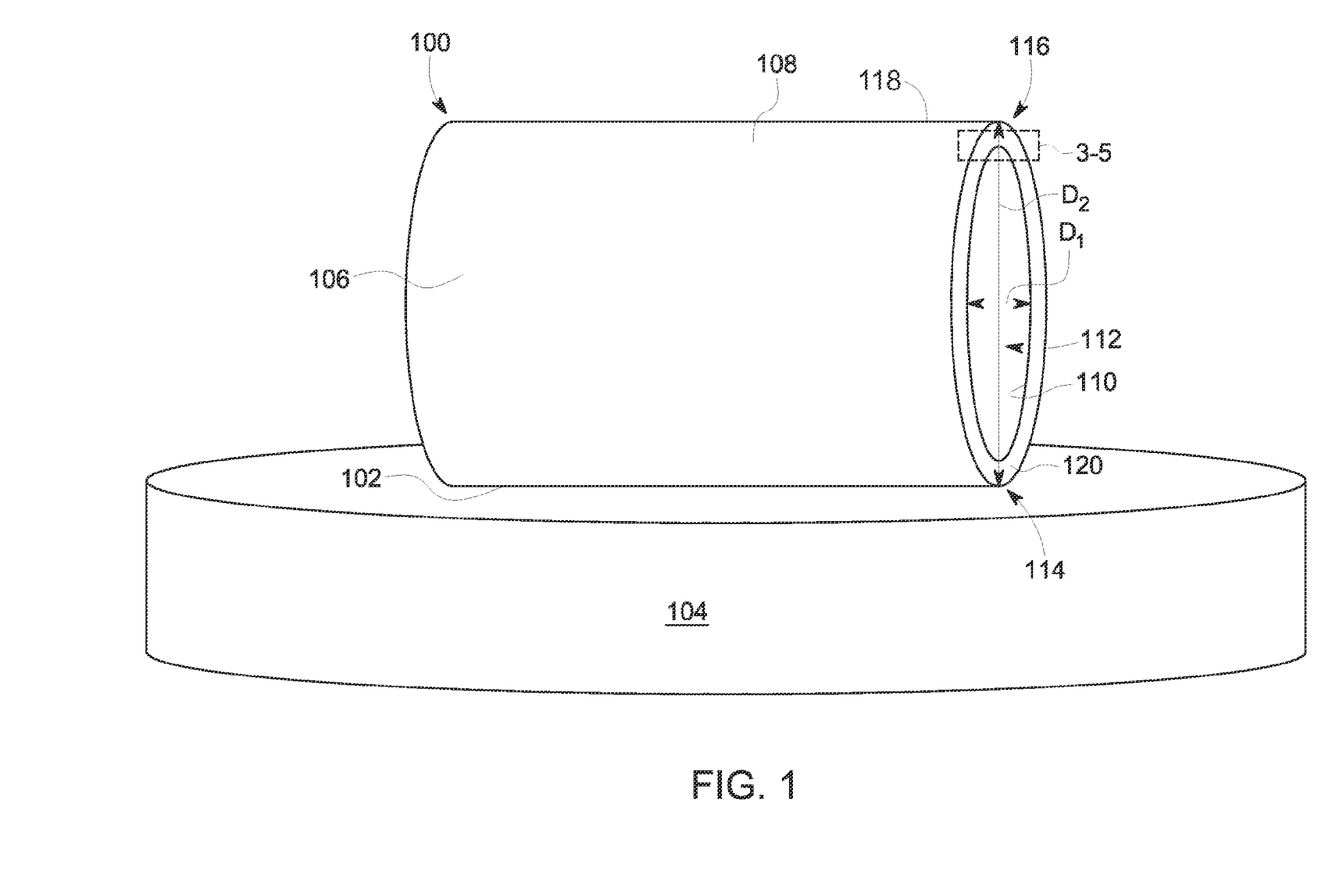
FIG. 1 is a perspective view of an exemplary fuel contacting component manufactured by an additive manufacturing apparatus.

FIG. 1 is an isometric view of an exemplary embodiment of a component 100 manufactured using an additive manufacturing system (not shown in FIG. 1) and coupled at a component bottom surface 102 to a build plate 104. In the exemplary embodiment, component 100 is a fuel nozzle for a gas turbine engine. Alternatively, component 100 may be any component that is fabricated using additive manufacturing and has at least one surface that is in contact with a liquid hydrocarbon fuel. In the exemplary embodiment, component 100 includes a body portion 106 having an exterior surface 108 and at least one interior surface 110 defining at least one internal passage 112 within component 100. Internal passage 112 is configured to channel a liquid hydrocarbon fuel through body portion 106 downstream to a combustion chamber (not shown). Component 100 also includes an inner diameter D1, an outer diameter D2, a bottom portion 114, and a top portion 116. Bottom portion includes bottom surface 102 and top portion 116 includes a top surface 118. In the exemplary embodiment component 100 is formed from a superalloy substrate 120, as described in further detail below.

Figure 2:
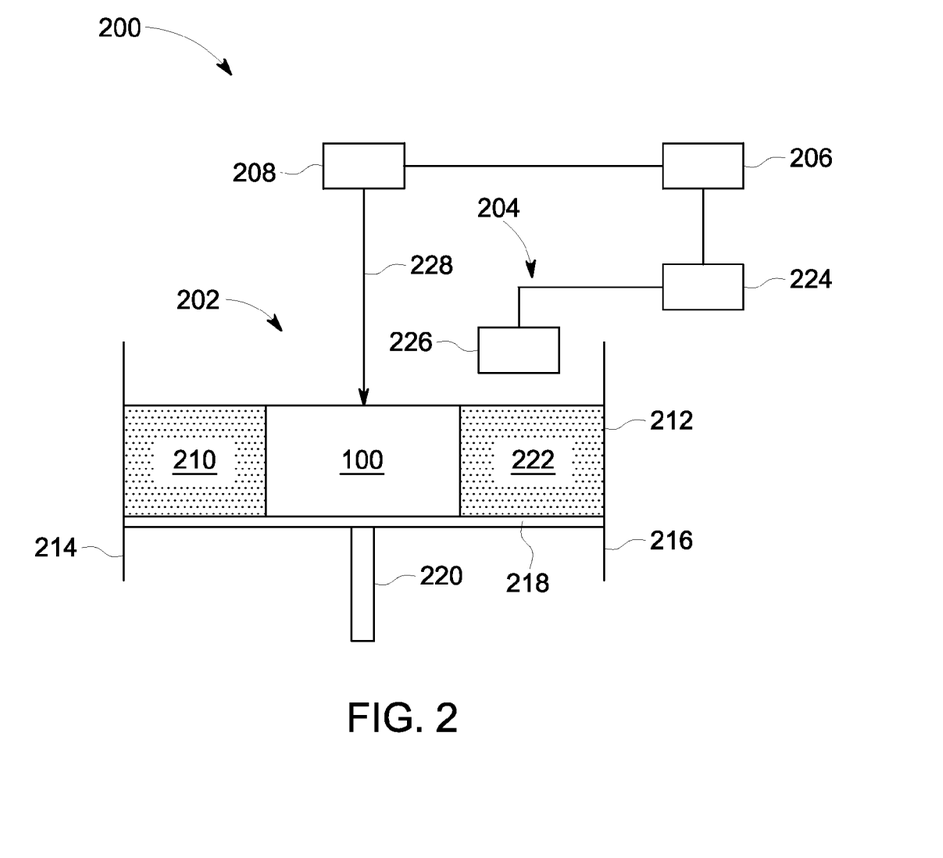
FIG. 2 is a schematic view of an exemplary additive manufacturing apparatus used to fabricate the component shown in FIG. 1.

FIG. 2 is a schematic view of an exemplary additive manufacturing system 200 used to fabricate component 100. In the exemplary embodiment, a model of component 100 is designed using computer aided design (CAD) software such that the model may include 3-dimensional coordinates of the complete formation of component 100 including body portion 106, inner diameter $D_1$, and outer diameter $D_2$ (shown in FIG. 1). Alternatively, the model may be defined in any suitable manner. The CAD model may also include a number of successive 2-dimensional cross-sectional slices that together form the 3-dimensional model. Generally, additive manufacturing provides faster material processing time, innovative joining techniques, and less concern for geometric constraints than known fabrication techniques. In one exemplary embodiment, direct metal laser melting (DMLM), also known as direct metal laser sintering (DMLS), is used to produce the additive-manufactured article, i.e., component 100. DMLM is a commercially available laser-based rapid prototyping and tooling process by which complex components may be directly produced by precision melting and solidification of metal powder into successive deposit layers of larger structures, each deposit layer corresponding to a cross-sectional deposit layer of the 3-dimensional component.

In the exemplary embodiment, system 200 is a DMLM system. Alternatively, system 200 may be any additive manufacturing system that facilitates fabricating component 100 as described herein. Additive manufacturing system 200 includes an additive manufacturing apparatus 202, a powder delivery system 204, a computer 206, and a laser 208 and functions to produce component 100 from a metal powder 210.

In the exemplary embodiment, apparatus 202 is a DMLM apparatus. Alternatively, apparatus 202 may be any additive manufacturing apparatus that facilitates fabricating component 100 as described herein. Additive manufacturing apparatus 202 includes a powder bed 212 having a first side wall 214 and an opposing second side wall 216. Additive manufacturing apparatus 202 further comprises build plate 104 that extends at least partially between first and second side walls 214 and 216 and that facilitates supporting component 100 during fabrication. A piston 220 is coupled to build plate 104 and is movable within powder bed 212 in a vertical direction along first and second side walls 214 and 216. Piston 220 is adjusted such that a top surface of build plate 104 defines a working surface 222. Powder delivery device 204 includes a powder supply 224 coupled to a powder applicator 226 that transfers powder 210 from delivery device 204 to apparatus 202. In the exemplary embodiment, powder applicator 226 is a wiper configured to distribute an even layer of powder 210 into powder bed 212. Alternatively, powder applicator 226 may be a spray nozzle that transfers powder 210 from powder supply 224 to powder bed 212. Generally, powder applicator 226 may be any device that transfers powder 210 from powder supply 224 to powder bed 212 such that system 200 operates as described herein.

During operation, powder applicator 226 distributes an even layer of powder 210 from powder supply 224 onto working surface 222 of build plate 104. Laser 208 directs a laser beam 228, which is guided by computer 206, onto working surface 222 of build plate 104 to selectively fuse powder 210 into a cross-sectional layer of component 100. More specifically, laser beam 228 selectively fuses powder 210 into bottom surface 102 (shown in FIG. 1) of component 100 by rapidly melting powder 210 particles together to form a solid. As laser beam 228 continues to form a portion of each layer, heat is conducted away from the previously melted area, thereby leading to rapid cooling and solidification. In the exemplary embodiment, computer 206 controls laser beam 228 such that each layer of powder 210 will include unsintered powder and sintered powder that forms at least a portion of the cross-sectional layer of component 100.

In the exemplary embodiment, upon completion of a respective layer of component 100, build plate 104 is lowered by piston 220 and powder applicator 226 distributes an additional layer of powder 210 into powder bed 212 of additive manufacturing apparatus 202. Laser beam 228 is again controlled by computer 206 to selectively form another cross-sectional layer of component 100. This process is continued as successive cross-sectional layers are built into component 100. Each successive deposit layer of component 100 may be, for example, between 10 micrometers (µm) and 200 µm, although the thickness may be selected based on any number of parameters.

Accordingly, component 100 is fabricated beginning at bottom surface 102 such that a respective cross-sectional layer of component 100 may include at least a portion of body portion 106, inner diameter $D_1$, and outer diameter $D_2$. More specifically, additive manufacturing apparatus 202 facilitates simultaneously forming component body portion 106, exterior surface 108, and interior surface 110. When the additive manufacturing process is completed, any unsintered powder 210 is removed from exterior surface 108 and passage 112 (shown in FIG. 1) and component 100 is removed from powder bed 212 in anticipation of further processing.

In the exemplary embodiment, component 100 may be formed from powder 210 comprising a superalloy for example, a cobalt-based superalloy, such as cobalt-chrome, or a nickel-based superalloy, as well as high temperature stainless steels, titanium, chromium, or other alloys, or a combination thereof. Cobalt and nickel-based superalloys are most often used to fabricate gas turbine components because of the high strength required for long periods of service at the high temperatures characteristic of turbine operation. Powder 210 may be selected for enhanced strength, durability, and useful life, particularly at high temperatures. It is to be understood that for other components not subjected to high temperatures, other build materials may be used in additive-manufacturing processes as known in the art to form the first intermediate article from which the component is manufactured.

After fabrication, further processing of component 100 may be required. Such post-fabrication processing may include, for example, heat treatments, peening, polishing, hot isostatic pressing (HIP), or ECM. In some embodiments, one or more of the post-fabrication processing steps listed above are not necessary and may be omitted. In the exemplary embodiment, as a result of the additive manufacturing process, component 100 may include substantial surface roughness. Specifically, at least exterior and interior surfaces 108 and 110 (both shown in FIG. 1) may have a relatively rough surface finish and may not be suitable for use without further processing to facilitate smoothing at least exterior and interior surfaces 108 and 110. Moreover, interior surface 110 may require further processing to protect the superalloy substrate from build-up of coke residue.

Figure 3:
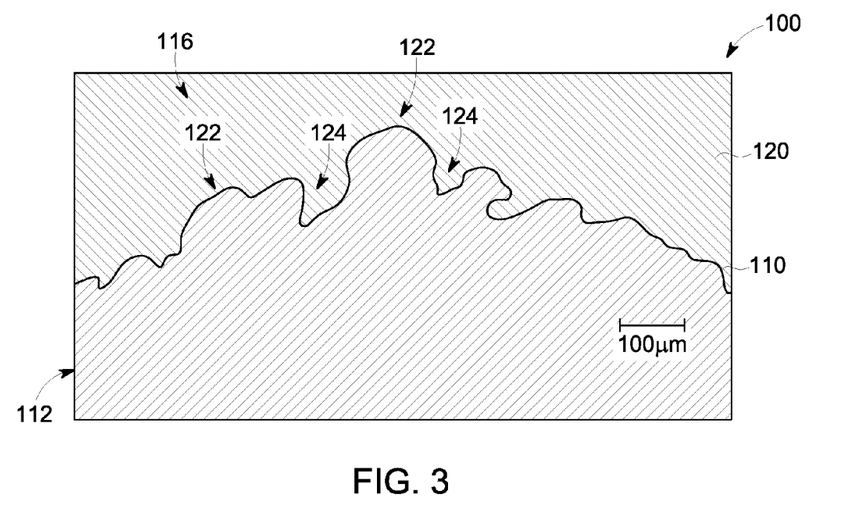
FIG. 3 is a cross-sectional photomicrograph of the fuel contacting component shown in FIG. 1 after completion of the manufacturing process shown in FIG. 2.
Figure 4:
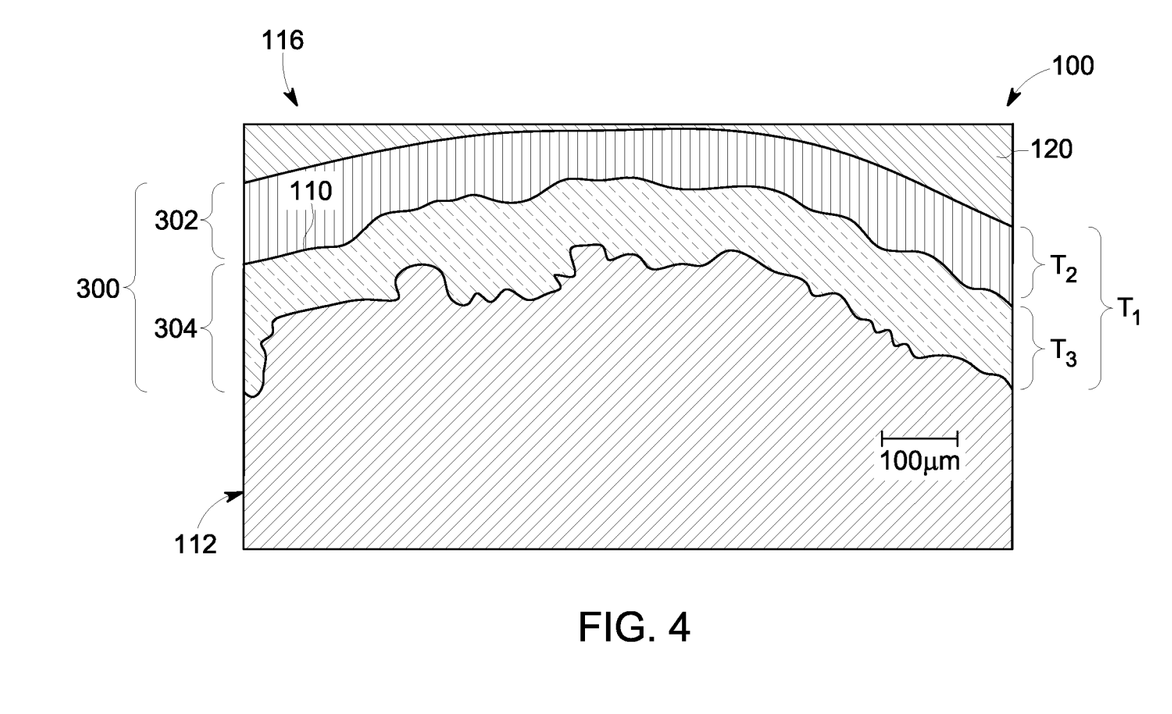
FIG. 4 is a cross-sectional photomicrograph of the fuel contacting component shown in FIG. 1 having a diffusion aluminide coating applied to an interior surface in accordance with an exemplary embodiment described herein.
Figure 5:
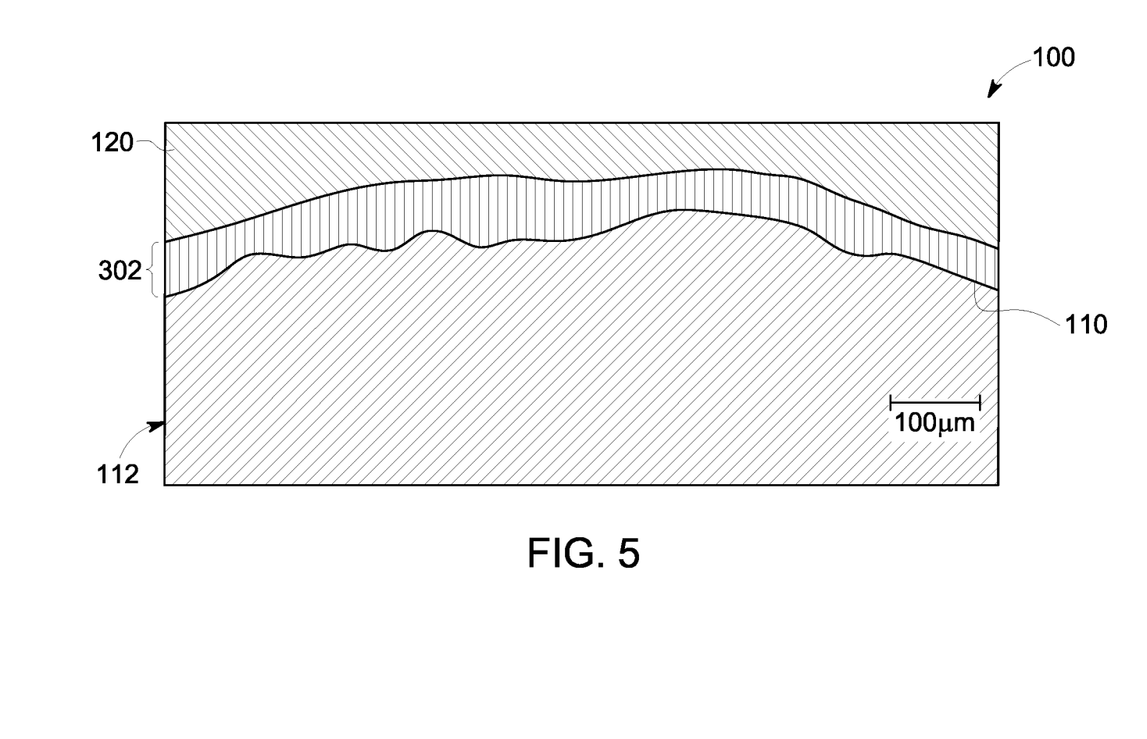
FIG. 5 is a cross-sectional photomicrograph of the fuel contacting component shown in FIG. 1 after being treated in accordance with the exemplary partial stripping process described herein.

FIGS. 3-5 are cross-sectional photomicrographs of fuel contacting component 100 at section 3-5 as shown in FIG. 1. FIGS. 3-5 illustrate component 100 at various stages of an aluminide and partial strip process that facilitates smoothing and providing a coke barrier coating to at least interior surface 110. Similar methods of aluminize and strip process are described in, by way of example only, U.S. Pat. No. 6,758, 914, the entirety of which is incorporated by reference herein. FIG. 3 shows top portion 116 of component 100 after completion of the manufacturing process shown in FIG. 2 and before any further processing. Interior surface 110 includes a plurality of troughs 122 and a plurality of ridges 124 that provide for a rough surface finish to interior surface 110 and prevent the smooth flow of fuel through internal passage 112. Further, fuel traveling through internal passage 112 becomes trapped in troughs 122 and forms a coke deposit on interior surface 110 of substrate 120 that facilitates decreasing the efficiency of the gas turbine engine, as described above.

FIG. 4 shows top portion 116 of component 100 after an aluminizing process has been completed. Component 100 includes a diffusion aluminide coating 300 applied to interior surface 110 in accordance with an exemplary embodiment described herein. Diffusion aluminide coating 300 includes a diffusion sublayer 302 between substrate 120 and interior surface 110, and an additive sublayer 304 between interior surface 110 and passage 112. In the exemplary embodiment, diffusion sublayer 302 is formed between substrate 120 and additive sublayer 304 such that additive sublayer 304 is radially inward of diffusion sublayer 302. FIG. 5 shows top portion 116 of component 100 after being treated in accordance with the exemplary partial stripping process described herein, wherein additive sublayer 304 (shown in FIG. 4), troughs 122, and peaks 124 have been removed.

The methods described herein provide for selectively removing only additive sublayer 304 of diffusion aluminide coating 300 from metallic substrate 120 such that underlying diffusion sublayer 302 and substrate 120 are unaffected. The methods described herein are generally applicable to additively manufactured, fuel contacting, metal components that operate within high-temperature environments, and are therefore subjected to the formation of coke and/or gum deposits on fuel contacting surfaces. Non-limiting examples of such components include fuel nozzles and fuel swirlers for use in gas turbine engines. While the advantages described herein are particularly applicable to nickel-based and cobalt-based superalloy components of gas turbine engines, the methods described herein are generally applicable to any component on which a diffusion aluminide coating may be used.

As mentioned above, the method described herein is directed to the removal of additive sublayer 304 of diffusion aluminide coating 300 on interior surface 110 of component 100, without removing or damaging the underlying diffusion sublayer 302 or substrate 120. As is known in the art, aluminiding processes produce additive sublayer 304 and diffusion sublayer 302. Diffusion sublayer 302 lies between the additive sublayer and the substrate, and is radially inward of interior surface 110. To promote oxidation resistance, at least one noble metal is usually deposited on substrate 120 prior to aluminiding, such that additive sublayer 304 should include these beneficial noble metal-aluminide intermetallic phases. In the exemplary embodiment, the noble metal is platinum, palladium, or mixtures thereof. Alternatively, the noble metal may be gold, silver, iridium, rhodium, and ruthenium. Beneath additive sublayer 304, diffusion sublayer 302 contains various intermetallic and metastable phases that are the products of some of the alloying elements of substrate 120 and diffusion coating 300.

In the exemplary embodiment, diffusion aluminide coating 300 on gas turbine engine component 100 includes a thickness $T_1$ in a range of between about 10 to about 125 µm. Alternatively, diffusion aluminide coating 300 may have any thickness that facilitates operation of component 100 as described herein. More specifically, diffusion sublayer 302 includes a thickness $T_2$ in a range between 0.5 µm and 50 µm and additive sublayer 304 includes a thickness $T_3$ in a range between 25 µm and 150 µm. Diffusion aluminide coating 300 is formed by applying a slurry composition that includes a powder including aluminum to interior surface 110. A slurry coating of substantially uniform thickness is provided by controlling the viscosity of the slurry and the processing conditions.

The slurry composition comprises a powder comprising aluminum, such as an aluminum powder or an aluminum-silicon alloy powder, a binder, and an optional stabilizer. In one embodiment, the slurry composition further comprises inert organic pyrolysable thickener particles that modify the viscosity of the slurry composition. In the exemplary embodiment the slurry composition is applied to interior surface 110 by immersing component 100 in a bath of the slurry composition. Alternatively, the slurry composition may be applied in any manner that facilitates formation of diffusion aluminide coating 300 as described herein, such as by spraying or vapor phase aluminizing.

In one embodiment, the slurry composition comprises an aluminum powder or an aluminum-silicon alloy powder and a binder such as colloidal silica, an organic resin, or a combination thereof. In another embodiment, the slurry composition comprises an aluminum powder or an aluminum-silicon alloy powder, a binder such as colloidal silica, and an organic stabilizer selected from the group consisting of an alkane diol, glycerol, pentaerythritol, a fat, a carbohydrate, or a combination including at least one of the foregoing organic compounds. The aluminum powder or aluminum-silicon alloy powder comprises between about 40 weight percent to about 70 weight percent of the entire slurry composition. The colloidal silica binder comprises between about 20 weight percent to about 40 weight percent of the entire slurry composition. The organic stabilizer comprises between about 5 weight percent to about 15 weight percent of the entire slurry composition. The powder comprising aluminum has an average particle size in a range between about 0.5 µm and about 100 µm.

The applied slurry is heated to a temperature sufficient to diffuse the aluminum into a surface region of interior surface 110 of substrate 120, i.e., into the entire surface region, or some portion thereof. As used herein, the "surface region" extends to a depth within a range between approximately 75 µm and 200 µm into substrate 120 beyond interior surface 110. The diffusion time and temperature for this aluminizing step depends on various factors, including for example, the composition of substrate 120, the specific composition and thickness of the slurry, and the desired depth of diffusion sublayer 302. In the exemplary embodiment, the diffusion temperature is about 1200° F. (about 650° C.) to about 1600° F. (about 870° C.). More specifically, the heat treatment includes increasing the temperature of component 100 having the diffusion aluminide coating 300 to about 1200° F. in increments of approximately 45° F./minute, maintaining a temperature of approximately 1200° F. for approximately 10 minutes, then increasing the temperature to about 1600° F. in increments of approximately 45° F./minute, and finally maintaining a temperature of approximately 1600° F. in a range of between about one to about four hours. These temperatures are also high enough to remove by vaporization or pyrolysis any organic compounds that are present, such as, but not limited to stabilizers like glycerol. The diffusion heat treatment can be carried out by any convenient technique, such as by heating in an oven in a vacuum, in a partial vacuum, or under argon gas. The heat treatment described herein facilitates forming a diffusion aluminide coating 300 onto interior surface 110 of component 100, wherein diffusion aluminide coating 300 includes diffusion sublayer 302

In the exemplary embodiment, an aqueous solution is applied to component 100 after diffusion sublayer 302 and additive sublayer 304 are formed. The aqueous solution facilitates partially removing diffusion aluminide coating 300 to facilitate removal of additive sublayer 304 such that diffusion sublayer 302 and substrate 120 are substantially unaffected. In the exemplary embodiment, removing additive sublayer 304 facilitates forming a coke barrier coating in diffusion sublayer 302 to prevent coke formation on interior surface 110 and also facilitates eliminating or substantially reducing troughs 122 and peaks 124 (shown in FIG. 3) to reduce the surface roughness of interior surface 110. The aqueous composition for the exemplary embodiment includes hydroflourozironic acid having the formula $H_xZrF_6$. The subscript x is a quantity from 1 to 6, and more typically, from 1 to 3. Alternatively, the aqueous solution may be hydrofluorosilicic acid, hydrochloric acid, or any combination thereof. Materials of this type are available commercially, or can be prepared without undue effort. The preferred aqueous solution is $H_xZrF_6$, which is referred to by several names, such as "hydroflourozironic acid", "fluorozirconic acid", and "hexafluorozirconic acid".

When used as a single aqueous solution, the $H_xZrF_6$ acid is effective for removing additive sublayer 304 without depleting diffusion sublayer 302 or substrate 120. The preferred level of acid employed will depend on various factors, such as the type and amount of diffusion aluminide coating 300 being removed, the location of diffusion aluminide coating 300 on substrate 120, the material of substrate 120, the technique by which substrate 120 is being exposed to the aqueous solution (as described below), the time and temperature used for the treatment, and the stability of the aqueous solution in solution.

In general, the aqueous solution is present in a treatment composition at a molarity level in the range of about 0.05 M to about 5 M. More specifically, the level is in the range of about 0.5 M to about 3.5 M. In the exemplary embodiment, the aqueous solution may also include various additives that serve a variety of functions, such as catalytic regulators. Non-limiting examples of these additives are inhibitors, dispersants, surfactants, chelating agents, wetting agents, deflocculants, stabilizers, anti-settling agents, and anti-foam agents. An example of an inhibitor for the composition is a relatively weak acid, such as, but not limited to acetic acid. Such a material tends to lower the activity of the primary acid in the composition. This is desirable in some instances, e.g., to decrease the potential for pitting of interior surface 110 of substrate 120.

Various techniques may be used to treat component 100 with the aqueous composition. For example, component 100 may be continuously sprayed with the aqueous composition, using various types of spray guns, or a single spray gun could be employed. Additionally, the aqueous composition may simply be poured over component 100 and continuously recirculated. In the exemplary solution, component 100 is immersed in a bath of the aqueous composition. Immersion in this manner, in any type of vessel, facilitates the greatest degree of contact between the aqueous composition and additive sublayer 304 that is being removed. Immersion time and bath temperature will depend on many of the factors described above, such as the type of coating being removed and the amount of acid being used in the bath. Generally, the bath is maintained at a temperature in the range of about 60° F. (about 20° C.) to about 212° F. (about 100° C.), while component 100 is immersed therein. In preferred embodiments, the temperature is maintained in the range of about 85° F. (about 30° C.) to about 185° F. (about 85° C.). In some especially preferred embodiments, the temperature range is about 95° F. (about 35° C.) to about 130° F. (about 55° C.). The immersion time may vary considerably, but it is usually in the range of about 1 minute to about 10 hours, and preferably, in the range of about 10 minutes to about 4 hours. Typically, the bath is stirred or agitated during the treatment process. The partial removal of diffusion aluminide coating 300 via removal of additive sublayer 304 by use of an aqueous solution facilitates forming a coke barrier coating on interior surface 110 and also facilitates eliminating or substantially reducing troughs 122 and peaks 124 (shown in FIG. 3). The coke barrier coating is formed as diffusion sublayer 302, which, along with substrate 120, is substantially unaffected by the aqueous solution.

As a result of aqueous solution treatment, component 100 in the stripping bath usually forms a residue referred to as "smut" or "coating residue." This occurs because the degraded, additive sublayer 304 material continues to weakly adhere to the underlying diffusion sublayer 302. Consequently, aqueous solution treatment is usually followed by a post-removal step, often referred to as a "de-smutting" operation. In the exemplary embodiment, de-smutting an abrasion step, employed because it minimizes damage to diffusion sublayer 302 and substrate 120, e.g., grit blasting. For example, a pressurized air stream (usually less than about 100 pounds per square inch) containing aluminum oxide particles is directed across interior surface 110. The duration of grit blasting depends on various factors, such as the thickness and specific composition of the coating residue and the size and type of grit media. Typically, the process is carried out for about 30 seconds to about 3 minutes.

Alternatively any other known technique for abrading interior surface 110 may be used in lieu of grit-blasting. For example, interior surface 110 may be manually scrubbed with a fiber pad, e.g. a pad with polymeric, metallic, or ceramic fibers. Alternatively, interior surface 110 may be polished with a flexible wheel or belt in which aluminum or silicon carbide particles have been embedded. Liquid abrasive materials may alternatively be used on wheels or belts. These alternative techniques would be controlled in a manner that maintained a contact force against interior surface 110 that was no greater than the force used in the grit-blasting technique discussed above.

Other techniques, or combinations of techniques may also be employed in place of abrasion, to remove the coating residue. Examples include tumbling of component 100, or laser ablation of interior surface 110. Alternatively, sound waves (e.g., ultrasonic) may be directed against interior surface 110, causing vibrations that can shake loose the coating residue. For example, component 100 may be immersed in an ultrasonic bath of soap and water for 30 minutes followed by a 30 minute ultrasonic bath of pure water. For each of these alternative techniques, adjustments are made to control the relevant force applied against interior surface 110 of component 100, to minimize damage to substrate 120 or diffusion sublayer 302 being preserved. After de-smutting is complete, component 100 is rinsed using water or a combination of water and a wetting agent.

Furthermore, a worn or damaged protective coating applied over a substrate may be replaced by removing the worn or damaged coating prior to applying the slurry composition. As used herein, "worn" is meant to describe a coating which no longer offers a desired level of coke protection. The first step of this embodiment is the partial chemical stripping of the coating by the process described above. In other words, substrate is contacted with an aqueous composition comprising one of the aqueous solutions described above. De-smutting and rinsing steps, previously discussed, usually follow the treatment.

When the partial stripping process described herein is carried out, the additive sublayer of such a coating can be repeatedly removed and replaced. As such, at least of the above steps of applying the slurry composition, heat treating the coating to form diffusion aluminide coating 300, and removing additive sublayer 304 of the diffusion aluminide coating with an aqueous solution may be repeated. Thus, the specified wall thickness of component 100 can be maintained for a greater service period. This advantage is an important feature in a commercial setting, where component replacement and repair is a time-consuming and expensive undertaking.

The above-described additive manufacturing and diffusion aluminide coating methods provide cost-effective methods for reducing the amount of coke formation and improving the surface finish on an interior surface of a fuel contacting component, such a fuel nozzle in a gas turbine engine. The embodiments described herein facilitate the formation of a coke barrier coating on a component to protect the component and extend its useful lifetime. Specifically, the methods described herein include applying a slurry composition to at least one surface of an additively manufactured component. The slurry is diffused into the surface of the component to create a diffusion aluminide coating comprising a diffusion sublayer on the component surface and an additive sublayer on the diffusion sublayer. Moreover, the methods described herein further facilitate removal of the additive sublayer using an aqueous solution to reduce the component surface roughness and to produce the coke barrier coating on the component surface. The diffusion process smoothens the component surface by filling in the troughs and removing the peaks formed during the additive manufacturing process. The remaining diffusion sublayer of the diffusion aluminide coating acts as a coke barrier coating to prevent coke deposits from forming a film on the component surface. The devices, systems, and methods are described herein as applied generally to any fuel contacting component fabricated by additive manufacturing. More specifically, the devices, systems, and methods described herein may be applied to, without limitation, fuel nozzles used in aircraft engines, fuel injectors used in gas turbine engines, and any component located within a hot gas path such as turbine blades, turbine nozzles, and bearings. Generally, the devices, systems, and methods described herein may be applied to any component where surface finish of an internal passage is critical.

An exemplary technical effect of the systems, methods, and apparatus described herein includes at least one of: (a) facilitating the prevention of coke and gum deposit formation on a fuel contacting component manufactured by additive manufacturing; (b) facilitating the reduction of surface roughness of the fuel contacting component caused by the additive manufacturing process; and (c) increasing the efficiency of the gas turbine engine by facilitating a smooth flow of liquid fuel through the fuel contacting component.

Exemplary embodiments of methods for manufacturing a fuel contacting component that facilitates reducing coke formation on at least one surface of the fuel contacting component exposed to a liquid fuel are described above in detail. The additive manufacturing and diffusional aluminide coating methods are not limited to the specific embodiments described herein, but rather, components of systems and/or steps of the methods may be utilized independently and separately from other components and/or steps described herein. For example, the methods may also be used in combination with other coating methods, and are not limited to practice with only the diffusion aluminide coating methods as described herein. Rather, the exemplary embodiment can be implemented and utilized in connection with many other coating applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of manufacturing a fuel contacting component that facilitates reducing coke formation on at least one surface of the fuel contacting component exposed to a liquid fuel, said method comprising:
    applying a slurry composition that includes a powder including aluminum to the at least one surface, wherein the fuel contacting component is formed by an additive manufacturing process;
    heat treating the slurry composition to diffuse the aluminum into the at least one surface, wherein heat treating comprises forming a diffusion aluminide coating including a diffusion sublayer on the at least one surface and an additive sublayer on the diffusion sublayer; and
    removing the additive sublayer of the diffusion aluminide coating with at least one aqueous solution such that the diffusion sublayer and the at least one surface are substantially unaffected, wherein the diffusion sublayer facilitates preventing coke formation on the at least one surface, wherein the diffusion aluminide coating has a thickness of between about 10 to about 125 μm, the diffusion sublayer has a thickness in a range between 0.5 μm and 50 μm, and the additive sublayer has a thickness in a range between 25 μm and 150 μm.

2. The method of claim 1, further comprising:
    forming a coating residue on the at least one surface after treatment in the aqueous solution; and
    removing the coating residue using a technique including at least one of abrasion, tumbling, laser ablation, and ultrasonic agitation.

3. The method of claim 1, wherein the at least one surface is a surface of a fuel nozzle for use in a gas turbine engine.

4. The method of claim 1, wherein the at least one surface is formed from one of a nickel-based or cobalt-based superalloy.

5. The method of claim 1, wherein the diffusion aluminide coating has a thickness within a range between approximately 10 micrometers and approximately 125 micrometers.

6. The method of claim 1, wherein the at least one aqueous solution is selected from the group including at least one of hydroflourozirconic acid, hydrofluorosilicic acid, hydrochloric acid, or a combination thereof.

7. The method of claim 1, wherein applying a slurry composition further comprises at least one of spraying the slurry composition onto the at least one surface, immersing the fuel contacting component in a bath of the slurry composition, and vapor phase aluminizing.

8. The method of claim 1, further comprising depositing at least one noble metal on the at least one surface.

9. The method of claim 1, wherein the at least one aqueous solution is present in a treatment composition at a molarity level in the range of about 0.5 M to about 5 M.

10. The method of claim 1, further comprising immersing the fuel contacting component having the diffusion aluminide coating in a bath of the at least one aqueous solution for a time period in a range between approximately 10 minutes and approximately 4 hours.

11. The method of claim 10, further comprising maintaining the at least one aqueous solution at a temperature in a range between approximately 30° C. and approximately 85° C.

12. The method of claim 1, further comprising applying the heat treatment for a time period in a range between approximately 1 hour and approximately 4 hours.

13. The method of claim 12, further comprising applying the heat treatment at a temperature in the range of between approximately 1200° F. and approximately 1600° F.

14. The method of claim 13, wherein applying the heat treatment comprises maintaining a temperature of approximately 1200° F. for approximately 10 minutes, then increasing the temperature to about 1600° F. in increments of approximately 45° F./minute, and maintaining a temperature of approximately 1600° F. in a range of between about one to about four hours.

15. The method of claim 1, wherein the powder including aluminum comprises between about 40 weight percent and about 70 weight percent of the slurry composition.

16. The method of claim 15, wherein the aluminum has an average particle size in a range between about 0.5 micrometers and about 100 micrometers.

17. The method of claim 15, wherein the slurry composition includes at least one binder selected from the group including at least one of colloidal silica, an organic resin, and a combination thereof.

18. The method of claim 17, wherein the slurry composition includes an organic stabilizer selected from the group including an alkane diol, glycerol, pentaerythritol, a fat, a carbohydrate, and a combination thereof.

19. The method of claim 18, wherein colloidal silica comprises between about 20 weight percent and about 40 weight percent of the slurry composition and organic stabilizer comprises about 5 weight percent to about 15 weight percent of the slurry composition.

* * * * *